May 8, 1945.   R. P. WOOD   2,375,720
ARTICLE HANDLING APPARATUS
Filed May 23, 1944   3 Sheets-Sheet 1
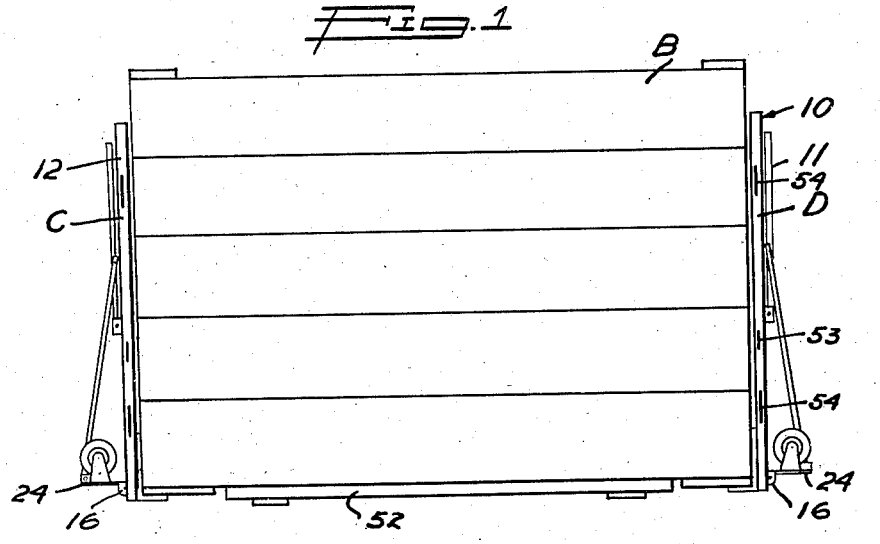
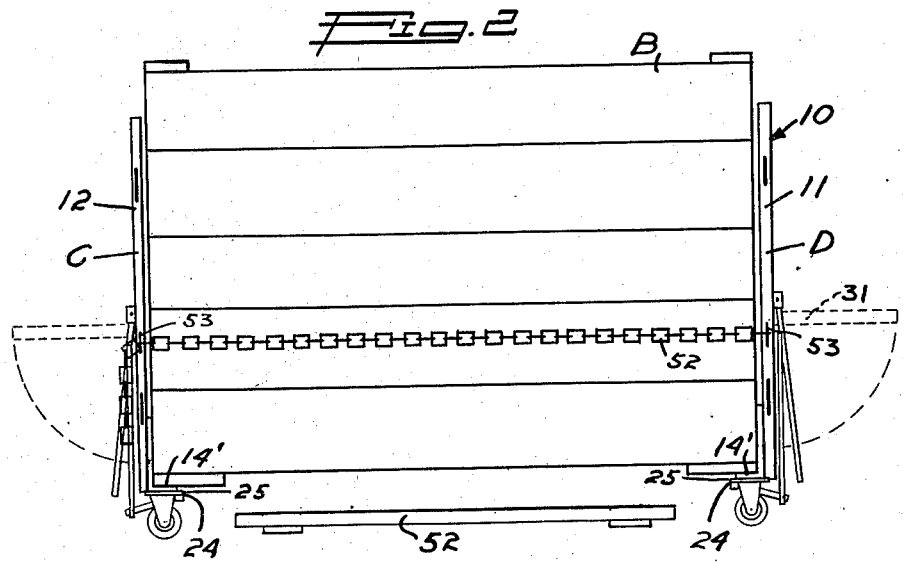
INVENTOR.
RAYMOND P. WOOD
BY B. J. Craig
Attorney

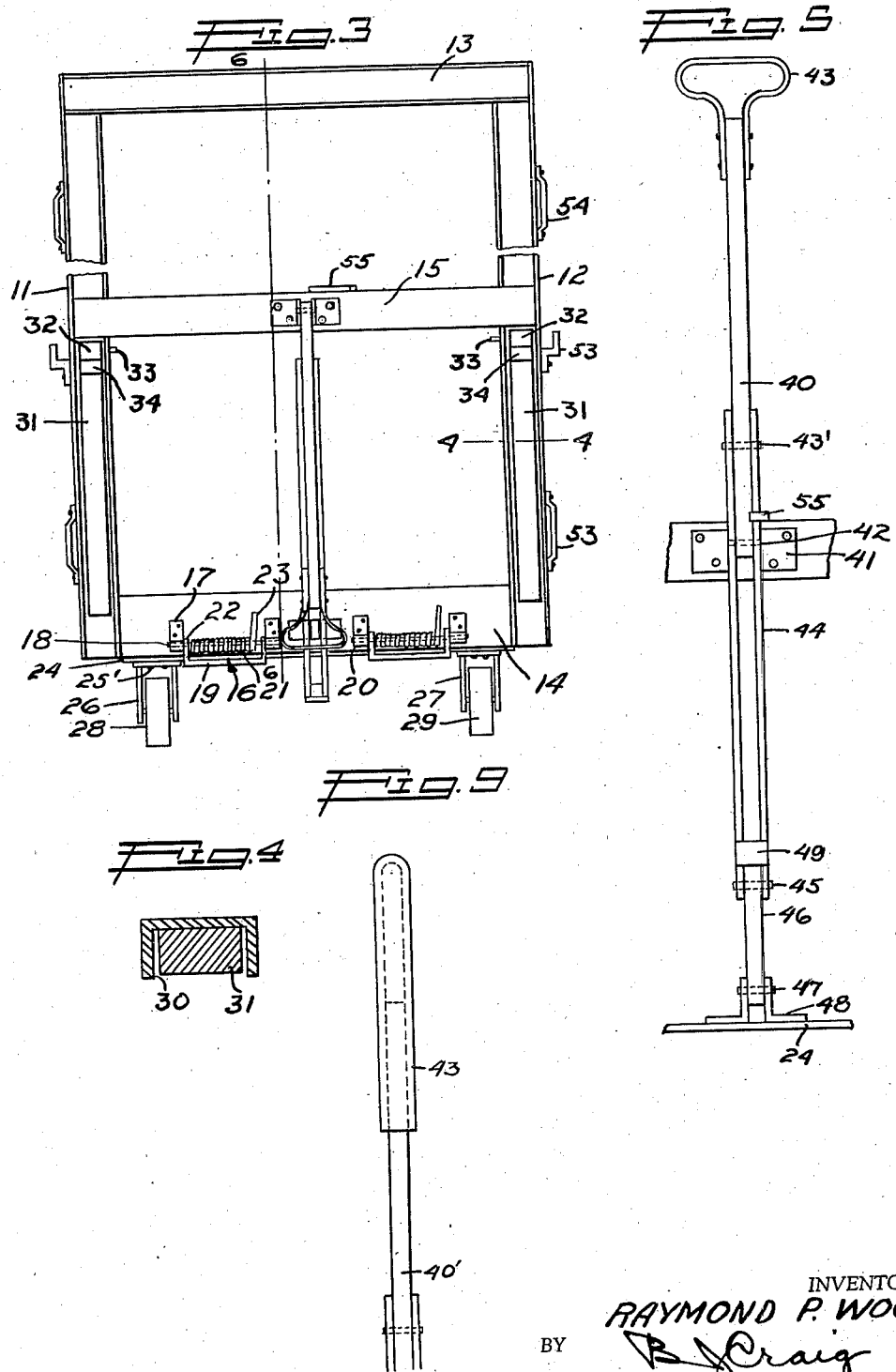

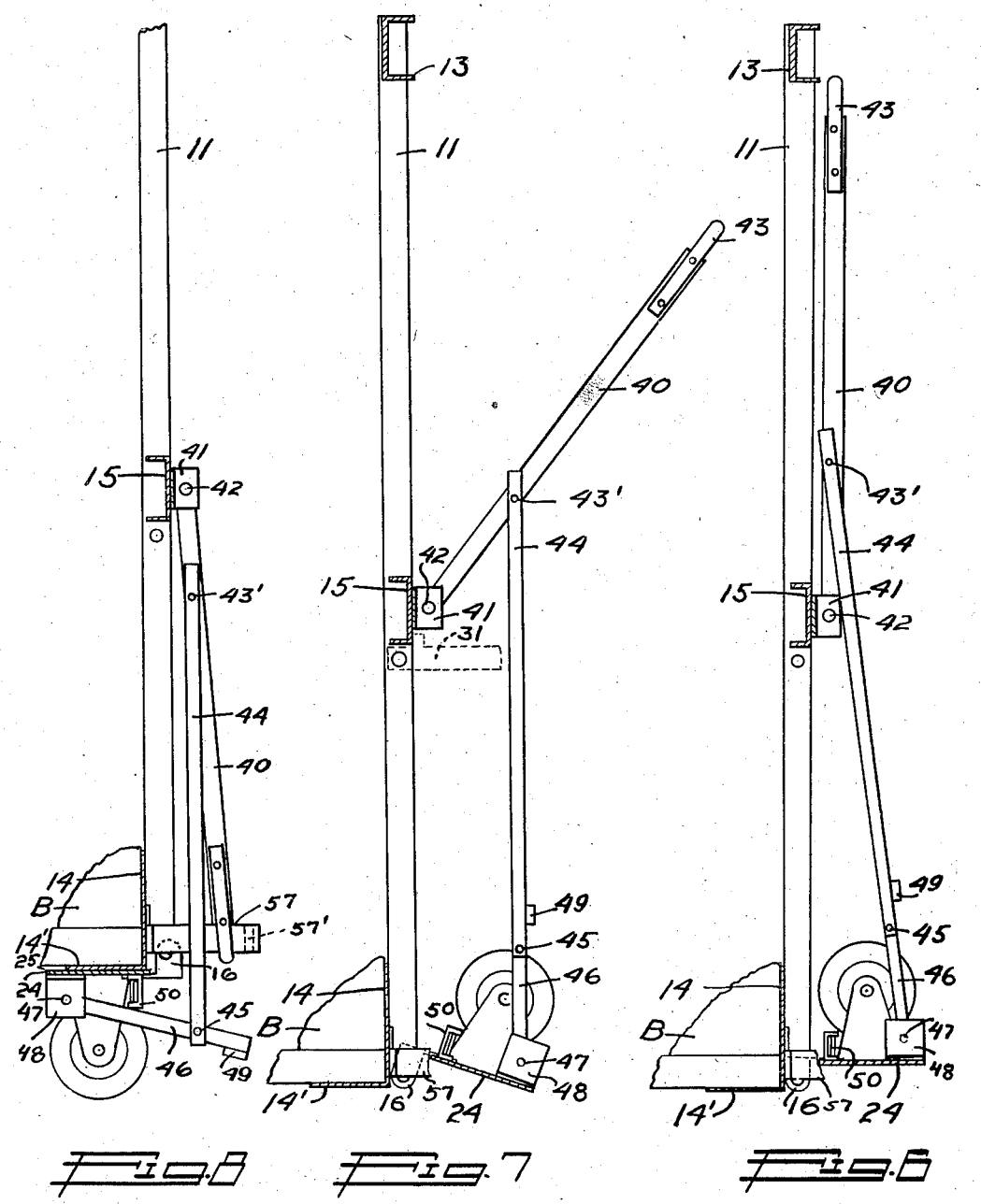

Patented May 8, 1945

2,375,720

UNITED STATES PATENT OFFICE 2,375,720

ARTICLE HANDLING APPARATUS

Raymond P. Wood, Whittier, Calif.

Application May 23, 1944, Serial No. 537,007

5 Claims. (Cl. 214—65.4)

This invention relates to an article handling apparatus which is adapted for use in connection with the moving of large objects such as boxes, refrigerators, stoves and the like.

A more specific object of my invention is to provide a novel means for raising an article and placing a set of dollies beneath an article to be moved.

Another object of this invention is to provide a novel means by which a dolly may be placed beneath the ends of a large and bulky object.

A further object of my invention is to provide a novel transportable unit.

A still further object of this invention is to provide a novel, compact, light weight article handling apparatus which permits easy storing when the apparatus is not in use.

Other and further important objects and the advantages of my invention will be apparent from the disclosures in the specification, appended claims, and in the accompanying drawings, wherein:

Fig. 1 is a side elevational view of the apparatus of this invention as used in connection with an article to be transported and showing the apparatus in the position it occupies prior to the placing of the dollies beneath the article;

Fig. 2 is a view similar to Fig. 1 showing the dollies beneath the articles;

Fig. 3 is an enlarged end view of the apparatus;

Fig. 4 is a view taken on line 4—4, Fig. 3, and on an enlarged scale;

Fig. 5 is an enlarged end view showing the link means for shifting the dolly support plate;

Fig. 6 is a section taken on line 6—6, Fig. 3;

Figs. 7 and 8 are views similar to view 6 showing the parts in other positions, and Fig. 9 is a fragmentary side elevation showing a modified handle.

This invention is an improvement on that shown in my copending application Serial No. 506,710, filed October 18 1943.

Referring to the drawings by reference characters, I have shown my invention as embodied in an article handling apparatus which is indicated generally at 10. As shown the apparatus may be used in connection with an article such as a box B although it will be understood that the apparatus may be used with large and bulky articles such as refrigerators, stoves, etc.

The apparatus 10 consists of two frame members C and D which are arranged at opposite ends or opposite sides of the article to be moved. Each member C and D includes spaced, vertical channel members 11 and 12. The upper ends of the members 11 and 12 are connected by a cross member 13 and their lower ends are connected by a member 14. The member 14 is shown as an angle having one side forwardly projecting at 14' to form a step portion. Spaced intermediate the members 13 and 14 I provide a channelled brace member 15.

Attached to the outside of the angle 14 I provide a pair of hinges indicated generally at 16. Each hinge includes a leaf member 17 secured to the angle 14 and pivotally mounted by a pintle pin 18 to ears 20 on a lower hinge leaf member 19. Arranged about each pin 18 I provide a coiled spring 21 which has one end attached to one of the ears 20 as at 22 and the other end extended as at 23 to be in pressure contact with the angle 14, and the construction of the spring is such that each spring normally urges the associated hinge 16 to an open position so that the hinges assume the position shown in Fig. 2.

Secured to the lower hinge plates 19 I arrange a dolly support plate 24 which extends, when in the lower position, slightly beyond the lower side of the angle 14 as at 25. Spaced inwardly from the ends of the plate 24 and mounted thereon as by rivets 25' I provide a pair of U-shaped brackets 26 and 27 which support dollies 28 and 29.

Within the channelled portions 30 of the uprights 11 and 12, immediately below the cross ties 15, I arrange lifting handles 31 which are pivotally mounted to the sides of the uprights 11 and 12 as at 32 on pins 33. Each handle has a stop member 34 thereon which is adapted to engage the outer face of the associated cross tie member 15 when the handle is in the operative or horizontal position. The construction and arrangement of the handles 31 is such that upon being lowered they will fall by gravity to a completely retracted position within the spaces 30.

The construction just described is similar to that shown in my copending application above referred to. The improvement in this application resides in the provision of means for shifting the dolly support plate from inactive to active position and vice versa.

In the disclosure the frame members are each provided with a dolly support plate shifting arm which is indicated at 40. This arm is mounted on a pivot pin 41 which is secured on brackets 42 mounted on the intermediate brace member 15. The arm includes an operating handle 43. Intermediate the length of the arm 40 I pivot, as at 43', a pair of upper links 44 which at their lower ends have a pivot pin 45 which pivotally connects the upper links 44 to a lower link 46.

The lower end of the link 46 is connected by a pivot 47 with spaced bracket members 48 mounted on the dolly support plate 24. The link 46 may, if desired, be provided with a stop member 49 to limit the relative angular movement of the links in one direction.

The dolly support plate 24 is provided with a fulcrum member 50 which is shown as of channel shape. This fulcrum member is mounted on the dolly support plate 24 opposite the pivot pin 47 and is spaced from this pin for a purpose to be presently described.

In use the parts are positioned as shown in Fig. 1, with the article to be transported preferably arranged on a trestle or other support 52. The two frame members C and D are arranged on opposite ends of the article, with the step portions arranged beneath the article as shown in Fig. 1. Suitable chains 52 may then be secured to hook members 53 to hold the frames C and D in position. The particular construction and arrangement of the chains forms no part of the present invention and, in lieu of chains, I may pass strap members (not shown) through loops 54, arranged on the frames C and D.

When frames C and D are in place a hook member 55, which normally engages the link 44 to hold the parts in the position shown in Fig. 6, is released, permitting the arm to be moved. The arm 40 is then swung downwardly as shown in Fig. 7, with the lower end of the dolly support plate 24 engaging the floor or base upon which the apparatus rests. When in this position the handle members 31 may be moved to the dotted line position shown in Fig. 2 and the article may be raised, whereupon the dolly support plate will move inwardly until the parts have been raised sufficiently high to allow the dollies 28 and 29 to move under the foot members, whereupon the article is ready for transport.

When the frames are to be removed from an article, the parts being in the position shown in Fig. 8, the handle 43 is grasped and raised. This will move the links 44 upwardly and will tend to raise the pivot 45. This action will bring the link 46 to bear upon the fulcrum member 50 as shown in Fig. 8. Further upward movement of the arm 40 will cause the link 46 to pivot about the fulcrum 50, thus rocking downwardly the pivot 47, and, since this pivot is on the dolly support plate, the latter will be rocked from the position shown in Fig. 8 to the position shown in Fig. 7, and further movement of the arms will move the parts to the position shown in Fig. 6, whereupon the hook 55 may be secured in place. The chains or straps will then be removed.

In order that a number of the devices may be towed, I secure upon the member 15 a coupling member 57 which has a hole 57' therein into which a suitable pin or other means may be inserted for coupling purposes. When the parts are in the position shown in Fig. 8 the member 57 is disposed between the links 44.

In Fig. 9, I show a modified shifting arm which is indicated at 40' and which receives a slidable handle 43'. The handle 43' may be shifted to secure the desired leverage and after use may be removed if desired.

From the foregoing description it will be apparent that I have invented a novel article handling apparatus which can be readily secured in place upon, and removed from, an article to be transported and which is highly efficient for its intended purpose.

Having thus described my invention, I claim:

1. An article handling apparatus comprising a supporting member including a body adapted to be secured upon an article to be transported, said body having a supporting portion adapted to be inserted under the article, a dolly support plate, means to pivotally support the dolly support plate on said member for movement from a position remote from said supporting portion to a position beneath said portion, anti-friction means mounted on said dolly support plate, a dolly support plate shifting arm, means on said body and disposed above the dolly support plate for pivotally supporting said arm, a lower link pivotally supported on said dolly supporting plate, an upper link having one end pivotally engaging said lower link and having the other end pivotally connected to said arm intermediate the length of said arm, a fulcrum member mounted on said dolly support plate, said fulcrum member being arranged between said lower link and the axis of the pivotal support of the dolly support plate, said fulcrum member being disposed to be engaged by an intermediate portion of said lower link.

2. An article handling apparatus comprising a supporting member including a body adapted to be placed adjacent to the end of an article to be transported, said body having a supporting portion adapted to be inserted under the article, a dolly support plate, means to pivotally support the dolly support plate on said member for movement from a position remote from said supporting portion to a position beneath said portion, roller means mounted on said dolly support plate, means normally urging the dolly support plate to a position beneath said article supporting portion, a dolly support plate shifting arm, means on said body and disposed above the dolly support plate for pivotally supporting said arm, a lower link pivotally supported on said dolly supporting plate, an upper link having one end pivotally engaging said lower link and having the other end pivotally connected to said arm intermediate the length of said arm, a fulcrum member mounted on said dolly support plate, said fulcrum member being arranged between said lower link and the axis of the pivotal support of the dolly support plate, said fulcrum member being disposed to be engaged by an intermediate portion of said lower link.

3. An article handling apparatus comprising a supporting member including a body adapted to be placed adjacent to the end of an article to be transported, said body having an article supporting step extending forwardly therefrom, and adapted to be inserted under the article, a dolly support plate, means to pivotally support the dolly support plate on said member with the axis of said pivotal support disposed at one side of, and remote from, said step, whereby the dolly support plate may move from a position remote from said article supporting step to a position beneath said step, roller means on said dolly support plate, resilient means normally urging the dolly support plate to a position beneath said article supporting step, a dolly support plate shifting arm, means on said body and disposed above the dolly support plate for pivotally supported porting said arm, a lower link pivotally supported on said dolly supporting plate, an upper link having one end pivotally engaging said lower link and having the other end pivotally connected to said arm intermediate the length of said arm, a fulcrum member mounted on said dolly support plate, said fulcrum member being arranged between said lower link and the axis of the pivotal support of the dolly support plate, said fulcrum member being disposed to be engaged by an intermediate portion of said lower link.

4. An article handling apparatus comprising a supporting member including a body adapted to be placed adjacent to the end of an article to be transported, said body having an article supporting step extending forwardly therefrom and adapted to be inserted under the article, a dolly support plate, means to pivotally support the dolly support plate on said member with the axis of said pivotal support disposed at one side of, and remote from, said step, whereby the dolly support plate may move from a position remote from said article supporting step to a position beneath said step, a pair of rollers mounted on said dolly support plate, resilient means normally urging the dolly support plate to a position beneath said article supporting step, a dolly support plate shifting arm, means on said body and disposed above the dolly support plate for pivotally supporting said arm, a lower link pivotally supported on said dolly supporting plate, an upper link having one end pivotally engaging said lower link and having the other end pivotally connected to said arm intermediate the length of said arm, a stop member on said lower link to limit the movement in one direction of said lower link relative to said upper link, a fulcrum member mounted on said dolly support plate, said fulcrum member being arranged between said lower link and the axis of the pivotal support of the dolly support plate, said fulcrum member being disposed to be engaged by an intermediate portion of said lower link.

5. An article handling apparatus comprising a supporting member including a body adapted to be secured on an article to be transported, said body having a forwardly extending step portion adapted to be inserted under the article, a dolly support plate, means to pivotally support the dolly support plate on said member with the axis of the pivotal support located at one side of and remote from the step portion to enable the dolly support plate to move from a position remote from said step portion to a position beneath said step portion, rollers mounted on said dolly support plate, a dolly support plate shifting arm, means on said body and disposed above the dolly support plate for pivotally supporting said arm, a link pivotally connected to said dolly support plate and to said arm, said link being movable by said arm for shifting the dolly support plate.

RAYMOND P. WOOD.